United States Patent
Peterson et al.

(10) Patent No.: US 12,146,093 B2
(45) Date of Patent: Nov. 19, 2024

(54) THERMAL MANAGEMENT MATERIALS AND METHODS OF MAKING THE SAME

(71) Applicants: Georgia Tech Research Corporation, Atlanta, GA (US); South Dakota School of Mines, Rapid City, SD (US)

(72) Inventors: G. P. "Bud" Peterson, Atlanta, GA (US); Haiping Hong, Rapid City, SD (US)

(73) Assignees: Georgia Tech Research Corporation, Atlanta, GA (US); South Dakota School of Mines, Rapid City, SD (US)

( * ) Notice: Subject to any disclaimer, the term of this patent is extended or adjusted under 35 U.S.C. 154(b) by 929 days.

(21) Appl. No.: 17/054,359

(22) PCT Filed: May 10, 2019

(86) PCT No.: PCT/US2019/031756
§ 371 (c)(1),
(2) Date: Nov. 10, 2020

(87) PCT Pub. No.: WO2019/217840
PCT Pub. Date: Nov. 14, 2019

(65) Prior Publication Data
US 2021/0062061 A1    Mar. 4, 2021

Related U.S. Application Data

(60) Provisional application No. 62/669,860, filed on May 10, 2018.

(51) Int. Cl.
*C09K 5/10* (2006.01)
*C09K 5/14* (2006.01)
(Continued)

(52) U.S. Cl.
CPC .............. *C09K 5/10* (2013.01); *C09K 5/14* (2013.01); *H01B 1/04* (2013.01); *H01B 1/24* (2013.01)

(58) Field of Classification Search
CPC ... C09K 5/10; C09K 5/14; H01B 1/04; H01B 1/24
See application file for complete search history.

(56) References Cited

U.S. PATENT DOCUMENTS 6,054,520 A * 4/2000 Washio ................ C08K 3/38
524/495
7,189,778 B2 * 3/2007 Tobita ................. B29C 70/62
524/495

(Continued)

FOREIGN PATENT DOCUMENTS

JP    2002080617 A *  3/2002
WO   2016/190258 A1   12/2016

OTHER PUBLICATIONS

Wright et al. ("Magnetic field enhanced thermal conductivity in heat transfer nanofluids containing Ni coated single wall carbon nanotubes", Appl. Phys. Lett., 91, 173116, 2007) (Year: 2007).*

(Continued)

*Primary Examiner* — Matthew R Diaz
(74) *Attorney, Agent, or Firm* — Troutman Pepper Hamilton Sanders LLP; Ryan A. Schneider

(57) ABSTRACT

The present invention relates to thermal materials and methods of making the same. Disclosed herein is a thermal material, comprising: a boron-containing nanomaterial; and a thermal fluid operable to hydrogen bond with the boron-containing nanomaterial; wherein the thermal material presents an increase in thermal conductivity over the pure thermal fluid by an amount of 30% or greater. Also disclosed herein are methods for making a thermal material.

17 Claims, 4 Drawing Sheets

(51) Int. Cl.
*H01B 1/04* (2006.01)
*H01B 1/24* (2006.01)

(56) References Cited

U.S. PATENT DOCUMENTS

| | | | |
|---|---|---|---|
| 8,834,739 B1 | 9/2014 | Cumberland et al. | |
| 9,150,771 B2* | 10/2015 | Mazyar | C09K 5/14 |
| 10,689,556 B2 | 6/2020 | Watanabe et al. | |
| 2003/0153665 A1* | 8/2003 | Tobita | H01L 21/4871 |
| | | | 257/E23.09 |
| 2006/0188727 A1* | 8/2006 | Ito | C08K 7/00 |
| | | | 523/400 |
| 2007/0054105 A1* | 3/2007 | Hsiao | H01L 23/3733 |
| | | | 428/292.1 |
| 2010/0226095 A1* | 9/2010 | Mimura | H01L 23/3737 |
| | | | 165/185 |
| 2011/0040007 A1* | 2/2011 | Chandrasekhar | H01B 1/22 |
| | | | 524/404 |
| 2013/0309485 A1* | 11/2013 | Takayama | C09D 179/08 |
| | | | 428/323 |
| 2014/0339780 A1* | 11/2014 | Mazyar | C09K 5/10 |
| | | | 252/75 |
| 2015/0275063 A1* | 10/2015 | Raman | C08J 3/203 |
| | | | 252/75 |
| 2018/0249593 A1* | 8/2018 | Zhang | B29C 48/04 |

OTHER PUBLICATIONS

Yuan et al. ("Thermal conductivity of polymer-based composites with magnetic aligned hexagonal boron nitride platelets", ACS Appl. Mater. Interfaces, 2015, 7, 13000-13006) (Year: 2015).*

Kim et al. ("Vertical filler alignment of boron nitride/epoxy composite for thermal conductivity enhancement via external magnetic field", International Journal of Thermal Sciences, 100, 2016, 29-36) (Year: 2016).*

International Search Report and Written Opinion issued in Application No. PCT/2019/031756 dated Sep. 17, 2019 (22 pages).

Wang, et al., "Super Compatible Functional BN Nanosheets/Polymer Films wtih Excellent Mechanical Property and Ultra-High Thermal Conductivity for Thermal Management," Journal of Materials Chemistry C, Dec. 5, 2017.

* cited by examiner

THERMAL MANAGEMENT MATERIALS AND METHODS OF MAKING THE SAME

CROSS-REFERENCE TO RELATED APPLICATIONS

This application claims the benefit of U.S. Provisional Patent Application No. 62/669,860, filed 10 May 2018, the entire contents and substance of which is incorporated herein by reference in its entirety as if fully set forth below.

STATEMENT OF RIGHTS UNDER FEDERALLY SPONSORED RESEARCH

This invention was made with government support under Award No. NNX09AU83A awarded by the National Aeronautics and Space Administration (NASA) EPSCoR and under Cooperative Agreement W911NF-15-2-0034-S awarded by the United States Army Research Laboratories. The government has certain rights in the invention.

FIELD OF THE DISCLOSURE

The present disclosure relates generally to thermal materials and methods of making the same. Particularly, embodiments of the present disclosure relate to improved thermal management materials.

BACKGROUND

As circuits become smaller and denser, performance, efficiency, and lifetime of high-power electronics increasingly depends on rapid conduction of heat away from semiconductor junctions in the components. Without better ways for heat to escape, higher junction temperatures dramatically reduce performance of critical equipment, stress any system batteries, diminish efficiency and lifetime, and increase lifecycle maintenance and replacement costs. Navy-relevant electronic components include power conversion devices such as diodes and transistors used in almost every power supply, power converter, and many alternating current/direct current (AC/DC) components, used in combat systems, sensors on land and at sea, and components in high-temperature environments. Radio frequency (RF) systems used in radar, communications, and even Wi-Fi, all rely on RF diodes and transistors that are frequently pushed to their maximum performance limit, generating performance-degrading heat. The current state-of-the-art for insulators is dielectric material typically made from polymers or rubber, which can catch fire easily and degrade over time. Successfully cooling of components and systems requires both electrically insulating and electrically conductive passive heat transport.

Advanced electrically insulating materials for improved passive thermal management of high-power electronics are necessary to meet the increased power demands and miniaturization of electronic devices and systems. The goal is to have materials that will improve both performance and efficiency, lengthen lifetime, and reduce lifecycle costs with enhanced thermal conductivity, while remaining electrically insulating. Advanced materials that can lower junction temperatures within individual components, while at the same time serving as adhesives, pastes, underfills, and/or top side coatings for attaching components into systems or covering components are highly desirable. Embodiments of the present disclosure address this need as well as other needs that will become apparent upon reading the description below in conjunction with the drawings.

BRIEF SUMMARY OF THE INVENTION

The present invention relates to thermal materials and methods of making the same. An exemplary embodiment of the present invention can provide a thermal material, comprising: a boron-containing nanomaterial; and a thermal fluid operable to hydrogen bond with the boron-containing nanomaterial; wherein the thermal material presents an increase in thermal conductivity over the pure thermal fluid by an amount of 30% or greater.

In any of the embodiments disclosed herein, the thermal material can further comprise carbon-based nanoparticles.

In any of the embodiments disclosed herein, the carbon-based nanoparticles can comprise carbon nanotubes.

In any of the embodiments disclosed herein, the thermal material can further comprise a solvent fluid.

In any of the embodiments disclosed herein, the solvent fluid can comprise water.

In any of the embodiments disclosed herein, the boron-containing nanomaterial can comprise boron nitride.

In any of the embodiments disclosed herein, the boron nitride can be in the form of boron nitride nanotubes.

In any of the embodiments disclosed herein, the thermal fluid can comprise a polymer-based fluid.

In any of the embodiments disclosed herein, the thermal fluid can comprise a silicon-based fluid.

In any of the embodiments disclosed herein, the thermal material can present an increase in thermal conductivity of the pure thermal fluid by an amount of 100% or greater.

In any of the embodiments disclosed herein, the thermal material can present a thermal conductivity of 0.1 W/m-K or greater.

In any of the embodiments disclosed herein, the thermal material can present a thermal conductivity of 0.9 W/m-K or greater.

In any of the embodiments disclosed herein, the thermal material can present a thermal conductivity of 1.5 W/m-K or greater.

In any of the embodiments disclosed herein, the boron-containing nanomaterial can be present in the thermal fluid in a substantially linear configuration.

In any of the embodiments disclosed herein, the boron-containing nanomaterial can be uniformly distributed in the thermal fluid.

In any of the embodiments disclosed herein, the thermal material can present an electrical conductivity of 1000 ohms or greater.

In any of the embodiments disclosed herein, the boron-containing nanomaterial can be present in an amount of 7% or greater by weight, based on the total weight of the thermal fluid.

In any of the embodiments disclosed herein, the boron-containing nanomaterial can be present in an amount of 20% or greater by weight, based on the total weight of the thermal fluid.

In any of the embodiments disclosed herein, the carbon-based nanomaterial can be present in an amount of 3% or greater by weight, based on the total weight of the thermal fluid.

Another embodiment of the present disclosure can provide a method for fabricating a thermal material, comprising: mixing a polymeric fluid in a solvent to create a first solution; adding a boron-containing material to the first solution; and cooling the first solution.

In any of the embodiments disclosed herein, the method can further comprise casting the solution into a thin film.

In any of the embodiments disclosed herein, the casting can comprise a doctor blade and mayor bar method.

In any of the embodiments disclosed herein, the casting can comprise a three-roll mill.

In any of the embodiments disclosed herein, the method can further comprise: prior to the adding a boron-containing material: mixing, in a second solution, at least a boron nanomaterial precursor, a surfactant, and a magnetic nanomaterial; attaching, using the surfactant, the magnetic nanomaterial to the boron nanomaterial precursor, and filtering the second solution to obtain the boron-containing material.

In any of the embodiments disclosed herein, the mixing the second solution can comprise ultrasonication.

In any of the embodiments disclosed herein, the magnetic nanomaterial can comprise an iron-based nanomaterial.

In any of the embodiments disclosed herein, the method can further comprise aligning, in the first solution, the boron-containing material using an applied magnetic field wherein the boron-containing material is present in the solution in a substantially linear configuration.

In any of the embodiments disclosed herein, the method can further comprise adding carbon-based nanoparticles to the first solution.

In any of the embodiments disclosed herein, the carbon-based nanoparticles can comprise carbon nanotubes.

In any of the embodiments disclosed herein, the first solution can further comprise water.

In any of the embodiments disclosed herein, the boron-containing material can comprise boron nitride.

In any of the embodiments disclosed herein, the thermal material can present an increase in thermal conductivity of the pure polymeric fluid by an amount of 100% or greater.

In any of the embodiments disclosed herein, the thermal material can present a thermal conductivity of 0.1 W/m-K or greater.

In any of the embodiments disclosed herein, the thermal material can present a thermal conductivity of 0.9 W/m-K or greater.

In any of the embodiments disclosed herein, the thermal material can present a thermal conductivity of 1.5 W/m-K or greater.

In any of the embodiments disclosed herein, the method can further comprise distributing the boron-containing material uniformly in the first solution.

In any of the embodiments disclosed herein, the thermal material can present an electrical conductivity of 1000 ohms or greater.

In any of the embodiments disclosed herein, the boron-containing material can be present in an amount of 7% or greater by weight, based on the total weight of the thermal fluid.

In any of the embodiments disclosed herein, the boron-containing material can be present in an amount of 20% or greater by weight, based on the total weight of the thermal fluid.

In any of the embodiments disclosed herein, the carbon-based nanomaterial can be present in an amount of 3% or greater by weight, based on the total weight of the thermal fluid.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
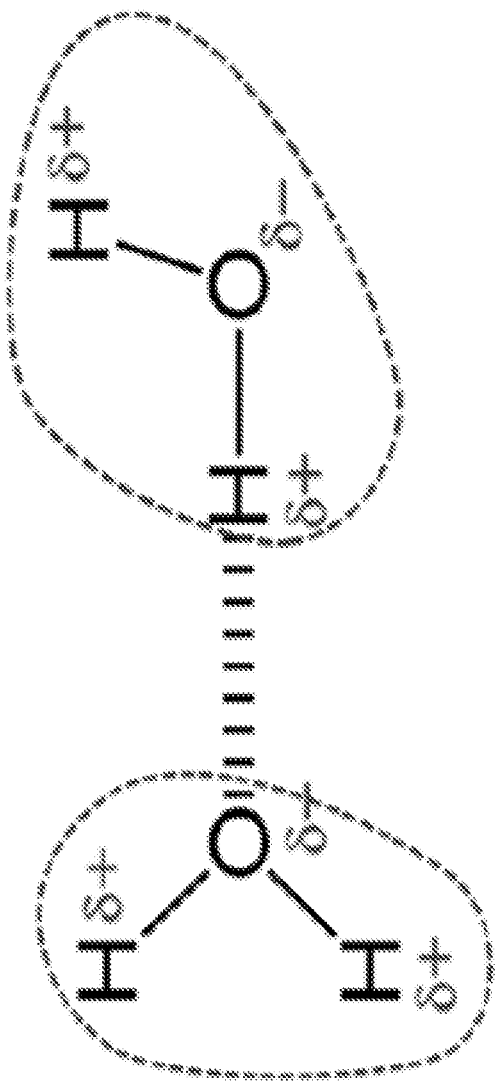
FIG. 1 shows a rendering of hydrogen bonding occurring in a thermal material according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As described above, a problem with current thermal materials is the tendency to catch fire easily and degrade over time. Successfully cooling of components and systems requires both electrically insulating and electrically conductive passive heat transport. Advanced electrically insulating materials for improved passive thermal management of high-power electronics are necessary to meet the increased power demands and miniaturization of electronic devices and systems. The goal is to have materials that will improve both performance and efficiency, lengthen lifetime, and reduce lifecycle costs with enhanced thermal conductivity, while remaining electrically insulating. Advanced materials that can lower junction temperatures within individual components, while at the same time serving as adhesives, pastes, underfills, and/or top side coatings for attaching components into systems or covering components are highly desirable. Such advances would greatly improve the design space in industries such as radar, communications, WiFi, power supply, power conversion, combat systems, sensors, transistors, diodes, and the like. Without better ways for heat to escape, higher junction temperatures dramatically reduce performance of critical equipment, stress any system batteries, diminish efficiency and lifetime, and increase lifecycle maintenance and replacement costs.

Embodiments of the present disclosure can provide new materials and methods to produce thin layers of materials with very high thermal conductivity (TC) by mixing and exfoliating nanoparticles and/or filler particles in order to form hydrogen bonds with polymeric solutions. Particularly, embodiments of the present disclosure can use a boron-containing nanomaterial, such as boron nitride nanotubes or nanosheets, to provide enhanced thermal performance. Additionally, the boron-containing nanoparticles can be aligned using external magnetic fields to create other desirable properties.

As used herein, the term "nanoparticle" refers to a particle having at least one dimension that is no greater than 500 nm, and sometimes no greater than 100 nm, and includes, for example, "nanospheres," "nanorods," "nanocups," "nanowires," "nanoclusters," "nanolayers," "nanotubes," "nanocrystals," "nanobeads," "nanobelts," "nanomaterial," and "nanodisks."

As used herein, the term "nanoscale" refers to a dimension that is no greater than 500 nm, and sometimes no greater than 100 nm. The terms "nanoscale particle" and "nanoparticle" are used interchangeably in the present invention.

As used herein, the term "surfactant" refers to a molecule having surface activity, including wetting agents, dispersants, emulsifiers, detergents, and foaming agents, etc.

Disclosed herein is a thermal material, comprising a boron-containing nanomaterial and a thermal fluid operable to undergo hydrogen bonding with the boron-containing nanomaterial. In some embodiments, the boron-containing nanomaterial can comprise boron nitride (BN). The BN can be in many forms, including but not limited to, nanotubes, nanosheets, spherical particles, and the like.

In some embodiments, the thermal material can comprise a carbon-based nanoparticle. Suitable examples of carbon-based materials for use in the present invention can include, but are not limited to, diamond nanoparticles, graphite nanoparticles, fullerenes, or carbon fibers. Furthermore, the carbon nanoparticles may be a combination of two or more selected from diamond nanoparticles, graphite nanoparticles, fullerenes, carbon fibers, and carbon nanotubes. A combination may be a mixture of two or more nanoparticles of the same type or of different types. For examples, a combination of two nanoparticles can be a mixture of single-walled nanotubes (SWNT) and multi-walled nanotubes (MWNT), a mixture of two SWNTs with different properties, a mixture of two MWNTs with different properties, a mixture of carbon nanotubes with graphite nanoparticles, a mixture of carbon nanotubes with diamond particles, and a mixture of carbon nanotubes with fullerenes.

In some embodiments, the thermal material can comprise a magnetic nanomaterial, such as elemental metals, metal oxides, metalloids, metal alloys, metal sulfides, metal seleniums, or a combination thereof. For example, the magnetic nanomaterial can comprise a metal oxide. A metal oxide nanoparticle is a nanoscale particle that comprises one or more metal oxides. Such metal oxides include, for example, those formed from metal and/or metalloid, either in elemental form and/or in compounds. Suitable metal/metalloid oxides include but are not limited to $Al_2O_3$, $CuO$, $MgO$, $SiO_2$, $GeO_2$, $B_2O_3$, $TeO_2$, $V_2O_5$, $BiO_2$, $Sb_2O_5$, $TiO_2$, $ZnO$, $FeO$, $Fe_2O_3$, $Fe_3O_4$, and $CrO_3$. As used herein, the chemical formula for a metal oxide nanoparticle refers to the chemical with that formula that is a component, usually the principal component, of the nanoparticle material. The chemical may be a major or minor component of the nanoparticle. As such, the nanoparticle may not have the same chemical composition as the chemical formula. Furthermore, unless specified, the chemical formula of a nanoparticle represents any of the possible crystalline forms. For example, the chemical formula Al.sub.2O.sub.3 may represent alpha-, beta-, or gamma-aluminum oxide, or combinations thereof.

In some embodiments, the disclosed thermal fluid can comprise one or more polymers in a polymeric solution. Suitable examples of a polymer for a polymer-based fluid can include, but are not limited to, biopolymers, inorganic polymers, organic polymers, conductive polymers, copolymers, fluoropolymers, polyterpenes, phenolic resins, polyanhydrides, polyketones, polyesters, polyimides (such as Matrimid 5218 or 6FDA-DAM), polyolefins, rubbers, silicones, silicone rubbers, superabsorbent polymers, synthetic rubbers, vinyl polymers, or a combination thereof. Other suitable examples of the polymer can include, but are not limited to, polyester resin, polyurethanes, polyurea, vulcanized rubber, bakelite, duroplast, urea formaldehyde, melamine resin, diallyl phthalate, epoxy resin, benzoxaines, polyimides, bismaleimides, cyanate esters, furan resins, silicone resins, thiolyte, vinyl ester, acrylic, polymethyl methacrylate, acrylonitrile butadiene styrene, chlorinated polyvinyl chloride, nylon, polylactic acid, polybenzimidazole, polycarbonate, polyether sulfone, polyoxymethylene, polyether ether ketone, polyethylene, polyphenylene sulfide, polypropylene, polystyrene, polyvinyl chloride, polyvinylidene fluoride, polytetrafluoroethylene, polyisoprene, polybutadiene, chloroprene, butyl rubber, halogenated butyl rubber, styrene butadiene, nitrile rubber, halogenated nitrile rubber, ethylene propylene rubber, ethylene propylene diene rubber, epichlorohydrin rubber, polyacrylic rubber, silicone rubber, fluorosilicone, fluoroelastomers, perfluoroelastomers, polyether block amides, chlorosulfonated polyethylene, ethylene vinyl acetate, thermoplastic elastomers, polysulfide rubber, cellulose acetate (CA), polymer of intrinsic micro porosity 1 (PIM-1), poly[3-(potassium-4-butanoate) thiophene] (PPBT), carboxymethyl cellulose (CMC), polyethylene glycol (PEG), or a combination thereof. Additional examples of suitable polymers useable include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyethersulfones; poly(arylene oxides) such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly(propylene), poly (butene-1), poly(4-methyl pentene-1), polyvinyls, e.g., poly (vinyl chloride), poly(vinyl fluoride), poly(vinylidene chloride), poly(vinylidene fluoride), poly(vinyl alcohol), poly (vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly (vinyl sulfates); polyallyls; poly(benzobenzimidazole); polyhydrazides; polyoxadiazoles; polytriazoles; poly (benzimidazole); polycarbodiimides; polyphosphazines; etc., and interpolymers and the like.

Embodiments of the present disclosure can provide a surfactant in the thermal fluid. A variety of surfactants may alternatively be included in the present invention as a dispersant to facilitate uniform dispersion of nanoparticles in a desired fluid medium, and to enhance stabilization of such a dispersion as well. The surfactants used in the present invention can contain a lipophilic nonpolar hydrocarbon group and a polar functional hydrophilic group. The polar functional group may be a carboxylate, ester, amine, amide, imide, hydroxyl, ether, nitrile, phosphate, sulfate, or sulfonate. The surfactants that are useful in the present invention may be used alone or in combination. Accordingly, any combination of surfactants may include anionic, cationic, nonionic, zwitterionic, amphoteric and ampholytic surfactants, so long as there is a net positive charge in the head regions of the population of surfactant molecules.

The surfactant used in the present invention may also be a combination of two or more selected from the group consisting of anionic, cationic, nonionic, zwitterionic, amphoteric, and ampholytic surfactants. Suitable examples of a combination of two or more surfactants of the same type include, but are not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of different types include, but are not limited to, a mixture of one anionic and one cationic surfactant, a mixture of one anionic and one nonionic surfactant, a mixture of one anionic and one zwitterionic surfactant, a mixture of one anionic and one amphoteric surfactant, a mixture of one anionic and one ampholytic surfactant, a mixture of one cationic and one nonionic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, e.g., a mixture of two anionic surfactants, is also included in the present invention.

The thermal materials of the present invention may also contain one or more other chemicals to provide other desired chemical and physical properties and characteristics, depending on whether they are hydrophobic or hydrophilic. In addition to the chemicals discussed separately below for hydrophilic and hydrophobic fluid mediums, many other known types of additives such as dyes and air release agents, can also be included in finished compositions produced and/or used in the practice of the present invention. In general, the additive components are employed in the disclosed solid materials in minor amounts sufficient to enhance the performance characteristics and properties of the material. The amounts will thus vary in accordance with such factors as the viscosity characteristics of the fluid medium, the viscosity characteristics desired in the finished solid, the service conditions for which the solid is intended, and the performance characteristics desired in the solid materials.

Suitable additional chemical additives include, but are not limited to, buffering agents, corrosion inhibitors, defoamers, and scale inhibitors.

The buffering agents may be selected from any known or commonly used buffering agents. It will be appreciated by those skilled in the art that selected buffering agents can exhibit both anti-corrosion and buffering properties. In certain formulations, for example, benzoates, borates, and phosphates can provide both buffering and anti-corrosion advantages. In addition, a base can be used to adjust the pH value of a fluid medium. Illustrative examples of bases for use with this invention include commonly known and used bases, for example, inorganic bases such as KOH, NaOH, $NaHCO_3$, $K_2CO_3$, and $Na_2CO_3$. Therefore, the buffering system and base can be adapted to provide a nanofluid composition with a pH level between 7.5 and about 11.

The corrosion inhibitors may be either an organic additive or an inorganic additive. Suitable organic anti-corrosive additives include short aliphatic dicarboxylic acids such as maleic acid, succinic acid, and adipic acid; triazoles such as benzotriazole and tolytriazole; thiazoles such as mercaptobenzothiazole; thiadiazoles such as 2-mercapto-5-hydrocarbylthio-1,3,4-thiadiazoles, 2-mercapto-5-hydrocarbyldithio- 1,3,5-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Suitable inorganic additives include borates, phosphates, silicates, nitrates, nitrites, and molybdates.

Suitable defoamers include components such as silicon defoamers, alcohols such as polyethoxylated glycol, polypropoxylated glycol or acetylenic glycols.

Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer.

Embodiments of the present disclosure can provide a thermal fluid. Suitable examples of a thermal fluid can include, but are not limited to, nonpolar solvents, polar aprotic solvents, polar protic solvents, water-miscible solvents, or a combination thereof. There are many examples of appropriate solvents known to one of ordinary skill in the art, but suitable examples can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, ethylene glycol, water, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

Certain components disclosed herein may be present in the thermal material in any amount suitable to confer a desirable property to the thermal material.

In some embodiments, the boron-containing nanomaterial can be present in an amount of 5% or greater (e.g., 6% or greater, 7% or greater, 8% or greater, 9% or greater, 10% or greater, 11% or greater, 12% or greater, 13% or greater, 14% or greater, 15% or greater, 16% or greater, 17% or greater, 18% or greater, 19% or greater, 20% or greater, 21% or greater, 22% or greater, 23% or greater, 24% or greater, 25% or greater, 30% or greater, 35% or greater, 40% or greater, 45% or greater, or 50% or greater) by weight, based on total weight of the thermal material. In some embodiments, the boron-containing nanomaterial can be present in an amount of 55% or less (e.g., 50% or less, 45% or less, 40% or less, 35% or less, 30% or less, 25% or less, 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, or 6% or less) by weight, based on total weight of the thermal material. In some embodiments, the boron-containing nanomaterial can be present in an amount of from 5% to 50% (e.g., from 5% to 10%, from 5% to 7%, from 7% to 10%, from 5% to 15%, from 5% to 20%, from 10% to 20%, from 5% to 25%, from 10% to 25%, from 5% to 50%, from 10% to 50%, or from 25% to 50%) by weight, based on total weight of the thermal material.

In some embodiments, the carbon-based material can be present in an amount of 3% or greater (e.g., 4% or greater, 5% or greater, 6% or greater, 7% or greater, 8% or greater, 9% or greater, 10% or greater, 15% or greater, 20% or greater, 25% or greater, 30% or greater, 35% or greater, 40% or greater, 45% or greater, or 50% or greater) by weight, based on total weight of the thermal material. In some embodiments, the carbon-based material can be present in amount of 50% or less (e.g., 45% or less, 40% or less, 35% or less, 30% or less, 25% or less, 20% or less, 15% or less, 10% or less, 9% or less, 8% or less, 7% or less, 6% or less, 5% or less, 4% or less, or 3% or less) by weight, based on total weight of the thermal material. In some embodiments, the carbon-based material can be present in an amount of from 3% to 50% (e.g., from 3% to 5%, from 5% to 7%, from 7% to 10%, from 3% to 10%, from 5% to 20%, from 5% to 25%, from 5% to 50%, from 10% to 20%, from 10% to 25%, from 10% to 50%, from 20% to 25%, from 20% to 50%, or from 25% to 50%) by weight, based on total weight of the thermal material.

In some embodiments, the thermal material can present a thermal conductivity of 0.1 W/m-K or greater (e.g., 0.2 W/m-k or greater, 0.3 W/m-K or greater, 0.4 W/m-K or greater, 0.5 W/m-K or greater, 0.6 W/m-K or greater, 0.7 W/m-K or greater, 0.8 W/m-K or greater, 0.9 W/m-K or greater, 1 W/m-K or greater, 1.5 W/m-K or greater, 2 W/m-K or greater, 2.5 W/m-K or greater, 3 W/m-K or greater, 3.5 W/m-K or greater, 4 W/m-K or greater, 4.5 W/m-K or greater, or 5 W/m-K or greater). In some embodiments, the thermal material can present a thermal conductivity of 0.1 W/m-K or less (e.g., 0.2 W/m-k or less, 0.3 W/m-K or less, 0.4 W/m-K or less, 0.5 W/m-K or less, 0.6 W/m-K or less, 0.7 W/m-K or less, 0.8 W/m-K or less, 0.9 W/m-K or less, 1 W/m-K or less, 1.5 W/m-K or less, 2 W/m-K or less, 2.5 W/m-K or less, 3 W/m-K or less, 3.5 W/m-K or less, 4 W/m-K or less, 4.5 W/m-K or less, or 5 W/m-K or less). In some embodiments, the thermal material can present a thermal conductivity of from 0.1 to 10 W/m-K (e.g., from 0.1 to 5 W/m-K, from 0.1 to 7 W/m-K, from 5 to 10 W/m-K, or from 7 to 10 W/m-K.

In some embodiments, the thermal material can present an electrical resistance of 1000 ohms or greater (e.g., 1100 ohms or greater, 1200 ohms or greater, 1300 ohms or greater, 1400 ohms or greater, 1500 ohms or greater, 1600 ohms or greater, 1700 ohms or greater, 1800 ohms or greater, 1900 ohms or greater, 2000 ohms or greater, 2500 ohms or greater, 3000 ohms or greater, 3500 ohms or greater, 4000 ohms or greater, 4500 ohms or greater, 5000 ohms or greater, 6000 ohms or greater, 7000 ohms or greater, 8000 ohms or greater, 9000 ohms or greater, or 10000 ohms or greater). In some embodiments, the thermal material can present an electrical resistance of 1000 ohms or less (e.g., 1100 ohms or less, 1200 ohms or less, 1300 ohms or less, 1400 ohms or less, 1500 ohms or less, 1600 ohms or less, 1700 ohms or less, 1800 ohms or less, 1900 ohms or less, 2000 ohms or less, 2500 ohms or less, 3000 ohms or less, 3500 ohms or less, 4000 ohms or less, 4500 ohms or less, 5000 ohms or less, 6000 ohms or less, 7000 ohms or less, 8000 ohms or less, 9000 ohms or less, or 10000 ohms or less). In some embodiments, the thermal material can present an electrical resistance of from 1000 ohms to 10000 ohms (e.g., from 1000 to 2000 ohms, from 2000 to 3000 ohms, from 3000 to 4000 ohms, from 4000 to 5000 ohms, from 5000 to 6000 ohms, from 6000 to 7000 ohms, from 7000 to 8000 ohms, from 8000 to 9000 ohms, from 9000 to 10000 ohms, from 1000 to 5000 ohms, or from 5000 to 10000 ohms).

In some embodiments, the thermal material can present an increase in thermal conductivity by an amount of 100% or greater (e.g., 110% or greater, 120% or greater, 130% or greater, 140% or greater, 150% or greater, 160% or greater, 170% or greater, 180% or greater, 190% or greater, 200% or greater, 250% or greater, 300% or greater, 350% or greater, 400% or greater, 450% or greater, 500% or greater, 600% or greater, 700% or greater, 800% or greater, 900% or greater, or 1000% or greater) over the pure thermal fluid. In some embodiments, the thermal material can present an increase in thermal conductivity by an amount of 100% or less (e.g., 110% or less, 120% or less, 130% or less, 140% or less, 150% or less, 160% or less, 170% or less, 180% or less, 190% or less, 200% or less, 250% or less, 300% or less, 350% or less, 400% or less, 450% or less, 500% or less, 600% or less, 700% or less, 800% or less, 900% or less, or 1000% or less) over the pure thermal fluid. In some embodiments, the thermal material can present an increase in thermal conductivity by an amount of from 100% to 1000% (e.g., from 100% to 200%, from 200% to 300%, from 300% to 400%, from 400% to 500%, from 500% to 600%, from 600% to 700%, from 700% to 800%, from 800% to 900%, from 900% to 1000%, from 100% to 500% or from 500% to 1000%) over the pure thermal fluid.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 3:
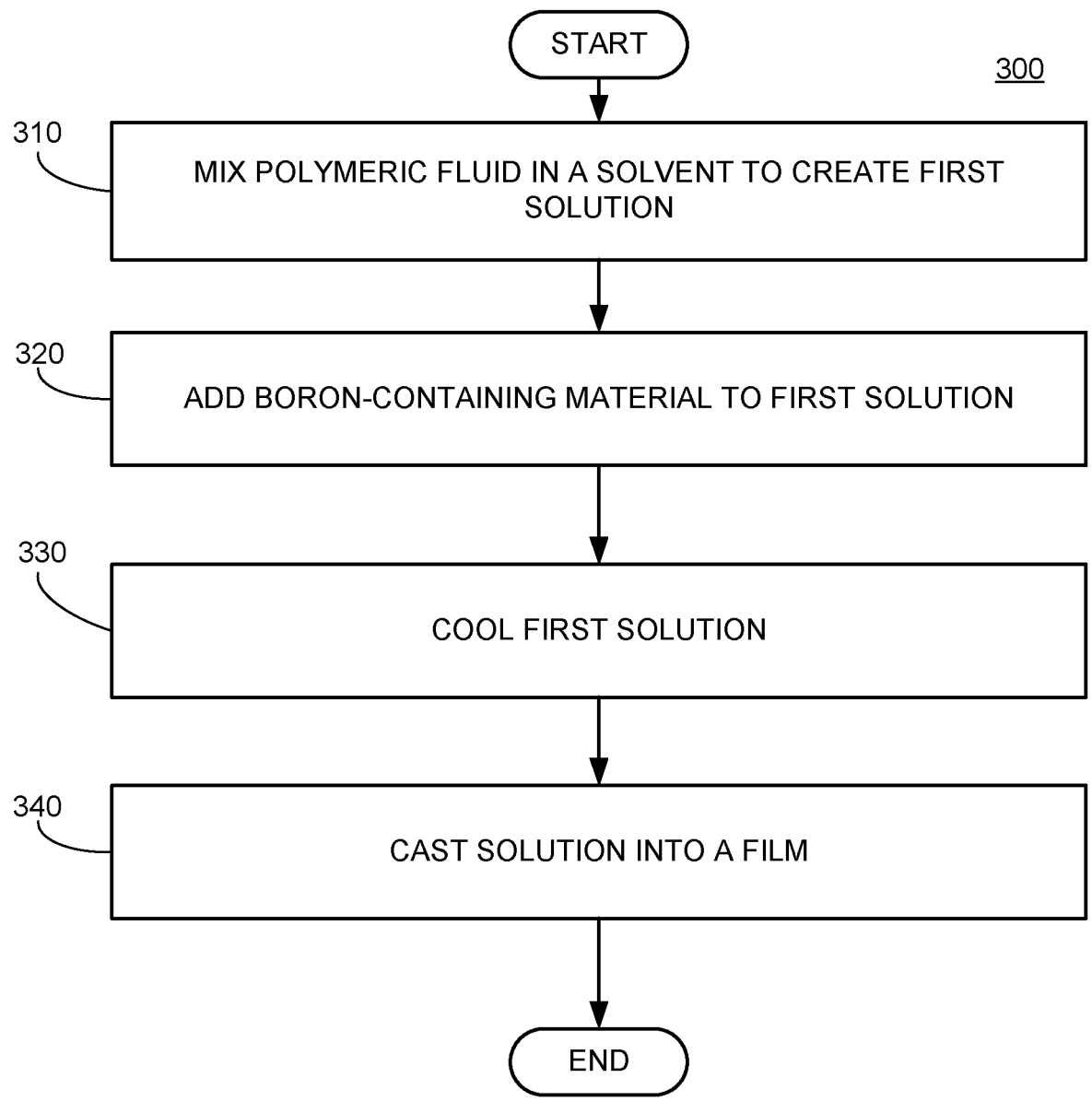
FIG. 3 is a flowchart of an exemplary method for making a thermal material.
Figure 4:
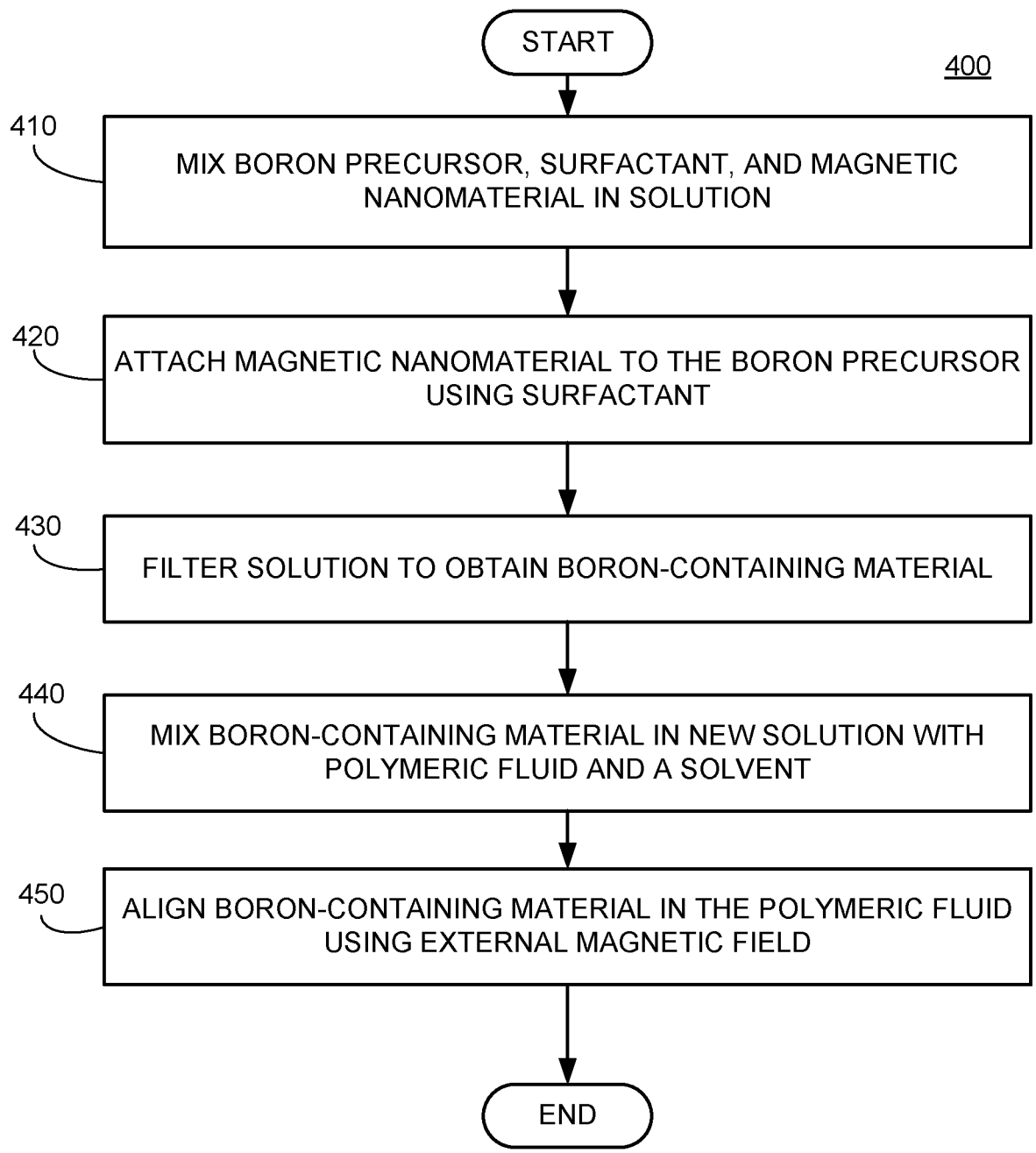
FIG. 4 is a flowchart of an exemplary method for making a thermal material.

FIGS. 3-4 illustrate exemplary embodiments of the presently disclosed method of making a homogeneously distributed solvent.

In FIG. 3, a method for making a thermal material is disclosed. In block 310, a first solution can be created by mixing a polymeric fluid in a solvent. In block 320, a boron containing material can be added to the first solution. In any of the aforementioned steps, the solution can be mixed using ultrasonication. Ultrasonication can be the least destructive to the structures of the nanoparticle materials. Ultrasonication can be done either in the bath-type ultrasonicator, or by the tip-type ultrasonicator. Typically, tip-type ultrasonication is for applications which require higher energy output. Ultrasonication at an intermediate intensity for up to 60 minutes, and usually in a range of from 10 to 30 minutes can be used to achieve better homogeneity. Additionally, the mixture can be ultrasonicated intermittently to avoid overheating. A variety of physical mixing methods are suitable for use in the present invention, including a conventional mortar and pestle mixing, high shear mixing, such as with a high-speed mixer, homogenizers, microfluidizers, high impact mixing, Morehouse mills, Buxton knife mills, Gaulin homogenizers, colloid mills, rotating knife-edge mills, rotor-stator mills, and three-roll mills, and ultrasonication methods. It is understood that, in some embodiments, the solution can comprise other species, such as inhibitors, catalysts, nonsolvents, and the like.

In block 330, the solution can be cooled. Methods of cooling can include thermal equilibrium with the atmosphere, refrigeration, ice baths, and the like.

In block 340, the cooled solution can be cast into a film. For example, the cooled solution can be cast into a film and cured using such methods as blade coating, doctor blade and mayor bar, dip coating, knife casting, or roller milling. Alternatively, the functional solution can be printed or built up on a substrate using known additive manufacturing techniques to create a 3-dimensional structure. In some embodiments, the functional solution can be spun into a fiber or hollow fiber using known techniques, such as the dry-jet wet-quench method. Additional embodiments or methods of forming the functional solution are considered, such as fused-deposition application, vapor-phase deposition, and other techniques known in the art suitable to distribute the functional solution.

In FIG. 4, a method for making a thermal material is disclosed herein. In block 410, at least a boron precursor material, a magnetic nanomaterial, and a surfactant can be mixed in a solution. In some embodiments, the solution can be mixed using ultrasonication. Ultrasonication can be the least destructive to the structures of the nanoparticle materials. Ultrasonication can be done either in the bath-type ultrasonicator, or by the tip-type ultrasonicator. Typically, tip-type ultrasonication is for applications which require higher energy output. Ultrasonication at an intermediate intensity for up to 60 minutes, and usually in a range of from 10 to 30 minutes can be used to achieve better homogeneity. Additionally, the mixture can be ultrasonicated intermittently to avoid overheating. A variety of physical mixing methods are suitable for use in the present invention, including a conventional mortar and pestle mixing, high shear mixing, such as with a high-speed mixer, homogenizers, microfluidizers, high impact mixing, Morehouse mills, Buxton knife mills, Gaulin homogenizers, colloid mills, rotating knife-edge mills, rotor-stator mills, and three-roll mills, and ultrasonication methods. It is understood that, in some embodiments, the solution can comprise other species, such as inhibitors, catalysts, nonsolvents, and the like. In some embodiments, the surfactant can comprise a surface charge. The surface charge of the surfactant can facilitate the surfactant to interact with the boron precursor material to uniformly distribute the boron precursor material in the fluid medium. A magnetic nanomaterial material having an opposite zeta potential to the surface charge of the surfactant can be added to the solution. The magnetic material can be mixed into the fluid medium using a method of mixing as outlined above.

Figure 2:
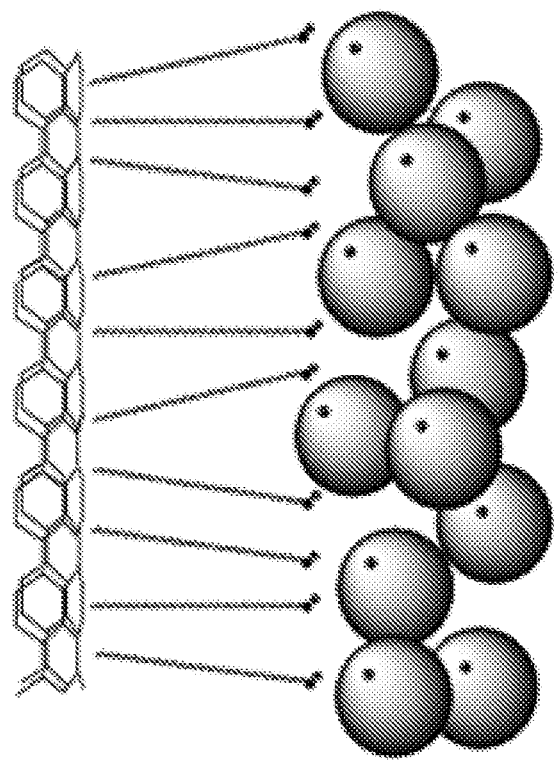
FIG. 2 shows a rendering of a thermal material according to some embodiments of the present disclosure.

In block 420, the surface charge of the surfactant can facilitate the surfactant to attract the magnetic nanomaterial using the principle of opposite charges. With the surfactant attached to the boron precursor material and uniformly distributed in the system, the charge attraction of the magnetic nanomaterial can draw the material to the uniform distribution as well to attach to the surfactant/boron precursor combination. An exemplary embodiment of an attachment of a boron precursor and a magnetic nanomaterial is illustrated in FIG. 2.

In block 430, the attached combination of the boron precursor and magnetic nanomaterial can be removed from the solution to obtain a boron-containing nanomaterial. In some embodiments, the removal can comprise vacuum filtering. Suitable examples of a filter can include a screen, a mesh, a sieve, and the like. Other methods of removing a solid from a fluid are considered, such as reverse osmosis, bag filters, paper filters, and the like.

In block 440, the boron-containing nanomaterial can be mixed into anew solution with a polymeric fluid and a solvent. The boron-containing nanomaterial and the polymeric fluid can be mixed in a solution using a method of mixing outlined above. It is understood that, in some embodiments, the solution can comprise other species, such as inhibitors, catalysts, nonsolvents, and the like.

In block 450, the boron-containing material can be aligned in the polymeric fluid using the application of an external magnetic field. In some embodiments, the boron-containing material can be aligned in a substantially linear fashion, or other desired configuration. The magnetic field can be applied externally using methods such as, magnetic bars, electromagnets, solenoids, and the like.

Reference will now be made in detail to exemplary embodiments of the disclosed technology, examples of which are illustrated in the accompanying drawings and disclosed herein.

EXAMPLES

The following examples are provided by way of illustration but not by way of limitation.

Example 1

Materials and Methods

The BN particles with different sizes from nano to micro and shapes (nanotube, nanosheet, etc.) can be purchased from vendors such as Lower Friction Inc and BNNT Inc.

It is reported that surface treatment will change BN particles' thermal performance and adhesion to other materials. A Harrick plasma cleaner can be used to treat BN particles and get a more hydrophilic surface. Another way to treat the surface is to use aqueous NaOH solution to treat the BN surface due to the reaction between BN and the OH ion to form OH—BN nanoparticles.

Raman, X-ray diffraction (XRD), scanning electron microscope (SEM) and Transmission electron microscope (TEM) may be used to characterize the above BN particles as received and after treatment, to compare particles' size, shape, purity, and functional group. The surface enhanced BN particles (hydrophilic) were used.

Self-curing polymeric solutions (paints) such as polyurethane, polyacrylic, and epoxy were purchased from a local "Menard's" store. These are commercial products and cost-effective.

The sample preparation procedure can follow slowly add Boron Nitride (BN) while stirring; once all BN particles have been added, continue stirring for 2 minutes; allow the sample to cool while stirring until it is safe to handle; and manufacture the coating through a standard "three-roll mill" at least eight times to obtain a smooth consistency.

TABLE 1

Thermal conductivity of BN particle-contained fluids.

| Sample No. | Base Fluid | 2nd Base Fluid | 1st particles | TC (W/mK) | TC Increase (%) |
|---|---|---|---|---|---|
| 1 | 17.2 g Glycerol | N/A | BN nano 2.8 g (14%) | 0.4584 | 47% |
| 2 | 17.2 g PAO | N/A | BN nano 2.8 g (14%) | 0.2320 | 36.6% |
| 3 | Glycerol 8.6 g (43%) | Water 8.6 g (43%) | BN-nano 2.8 g (14%) | 0.6528 | 45.8% |
| 4 | 14 g Krytox XHT 750 | N/A | BN nano 1.0 g (9.1%) | 0.1487 | 1.5% |
| 5 | Used Silicon oil from water bath heater | N/A | Silica nano 1.23 g (5.1%) | 0.1968 | 8% |

It can be seen that with the same amount of BN concentration (sample 1 and 2, 14 wt % BN loading), Glycerol fluid showed enhanced TC because glycerol could undergo hydrogen bonding with the BN particles, and PAO does not. Also, sample 4 contains krytox oil which contains the F atom and can form strong hydrogen bonding with BN. In 9.1 wt % BN sample, TC enhanced 31%, equivalent to the 47% enhancement in 14 wt % percent sample. Sample 3 contains the same concentration of BN, with 50:50 water and glycerol. Both solvents could form good hydrogen bonding with BN, and the TC shows the same enhancement. Sample 5 contains silicon oil and silica nanoparticle, wherein both the solvent and the particle are unable form hydrogen bonding. Therefore, the TC enhancement is low; only 8% at 5 wt % particle loading.

These TC results confirm that hydrogen bonding plays an important role in the TC enhancement of the fluid. In addition, the self-curing polymer solution (paints) that contain hydrogen bonding formed solvents such as ethanol, water, isopropanol, etc. were tested. Self-curing polymer solutions are commercially available, e.g., polyurethane, polyacrylic, epoxy. Several samples were made, and TC results are listed in Table 2.

TABLE 2

Thermal conductivity of BN particle contained polyurethane composite.

| Sample No. | Base fluids | Particles | TC (W/mK) | TC Increase (%) | Electrical conductivity |
|---|---|---|---|---|---|
| 1 | Polyurethane water based fluids | No particle | 0.36 (solid) | 0% | insulating |
| 2 | Polyurethane water based fluids | BN-nano 2.8 g (20%) | 1.02 | 283% | insulating |
| 3 | Polyurethane water based fluids | BN-nano 2.8 g (35%) | 1.78 | 494% | insulating |

Boron nitride nanotubes and sheets are quite expensive (>800 $/g), but carbon nanotubes, nanofibers, and graphite are commercially available (<2 $/g). Carbon nanofiber was added into the fluids and polymer composite. The results are listed as below.

TABLE 3

Thermal conductivity of BN particle contained fluids with the addition of carbon nano fiber.

| Sample No. | Base Fluid | 2nd Base Fluid | 1st particles | 2nd particles | TC (W/mK) | TC Increase (%) |
|---|---|---|---|---|---|---|
| 1 | 17.2 g Glycerol | N/A | BN-nano 1.4 g (7%) | CNF-19 1.4 g (7%) | 1.4453 | 366% |
| 2 | 17.2 g Glycerol | N/A | CNF-19 0.7 g 25% (3.5%) | BN nano 2.1 g 75% (10.5%) | 0.8975 | 188% |
| 3 | Glycerol 8.6 g (43%) | Water 8.6 g (43%) | BN-nano 1.4 g (7%) | CNF-19 1.4 g (7%) | 1.7885 | 299.5% |
| 4 | 23.87 g Used Silicon oil from water bath heater | N/A | CNF-19 1.24 g (4.9%) | N/A | 0.5097 | 180.5% |

TABLE 4

Thermal conductivity of BN particle containing polyurethane composite with the addition of carbon nano fiber.

| Sample No. | Base fluids | particles | TC (W/mK) | TC Increase (%) | Electrical conductivity |
|---|---|---|---|---|---|
| 1 | Polyurethane water based fluids | No | 0.36 | 0 | >1000 ohm |
| 2 | Polyurethane water based fluids with 5 wt % carbon nano fiber | BN-nano 2.8 g (20%) | 2.1 | 583% | >1000 ohm |

From Tables 3 and 4, it can be clearly seen that with the addition of carbon nano fiber, the TC increases significantly (7 wt % nearly 300%, sample 3). However, the polymer composite becomes conductive due to the nature of carbon nanofiber. The solicitation of this topic requires the high thermal management materials, but they should be insulating for desired applications in electronic devices.

Therefore, in this task, it is considered to use boron nitride (BN) nanotubes, and/or nanosheets to enhance the thermal performance of the polymer composite, but keep the composite material insulating. BN nanotubes and nanosheets can be purchased from Sigma Aldrich, Tekna Inc, and BNNT Inc.

Example 2

Materials and Methods

BN was purchased from Lower friction Inc. The surfactant sodium dodecylbenzene sulfonate (SDBS) and $Fe_2O_3$ nanoparticles were purchased from Sigma-Aldrich and used as received. Ultrasonication was performed with a Branson Model 450 Digital Sonifier with a ½LL disrupter horn. Initially, 3.5 g surfactant was first dispersed in deionized water of resistivity 18 Me-cm by using ultrasonication for 20 minutes until a clear solution was achieved. Then, 0.5 g Boron Nitride (BN) was added to the solution and sonicated for an additional 20 minutes. Finally, 0.25 g $Fe_2O_3$ nanoparticles were added to the mixture and sonicated for 40 minutes. After ultrasonication, the solution was filtered and dried inside a vacuum oven at 80° C. for 10 hours at a pressure of 15 inches of mercury.

The magnetically sensitive BN nanoparticles were added to the polyurethane solution, together with a small amount of BN nanotubes (sheets) (<5 wt %). The sample was stirred for 10 minutes and allowed to cool while stirring until safe to handle. The coating was then manufactured through a standard "three-roll mill" at least eight times to obtain a smooth consistency.

The doctor blade and mayor bar method were used to make the thin film of the BN thin film. The requirement of thin film thickness is around 50-1000 micron in the solicitation. These ranges fit well with the methods (doctor blade and mayor bar).

Since those polymer solutions (e.g., polyurethane, polyacrylic, epoxy) are self-curing, these materials could cure themselves (usually take 6-12 hours). Soon after the films are made, they will be ready for the thickness characterization and TC measurement.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method comprising:
    forming a first solution by mixing a polymeric fluid in a solvent;
    forming a second solution by adding a boron-containing material and a magnetic nanomaterial selected from the group consisting of $Al_2O_3$ and MgO to the first solution;
    aligning, in the second solution, the boron-containing material using an applied magnetic field; and
    forming a thermal material by cooling the second solution;
    wherein the polymeric fluid is selected to be operable to undergo hydrogen bonding with the boron-containing material;
    wherein forming the second solution further comprises adding a surfactant having a surface charge to the first solution;
    wherein the surface charge of the surfactant facilitates the surfactant to interact with the boron-containing material to uniformly distribute the boron-containing material in the second solution.

2. The method of claim 1, wherein the polymeric fluid comprises a silicon-based fluid.

3. The method of claim 1, wherein the boron-containing material comprises boron nitride.

4. The method of claim 1, wherein after the aligning in the second solution the boron-containing material is uniformly distributed in the second solution.

5. The method of claim 1, wherein after the aligning in the second solution the boron-containing material is present in the second solution in a substantially linear configuration.

6. The method of claim 1 further comprising casting the thermal material into a film having a thickness between 50 and 1000 microns.

7. The method of claim 6, wherein the casting comprises a three-roll mill.

8. The method of claim 1, forming the second solution further comprises adding carbon-based nanoparticles.

9. The method of claim 8, wherein the carbon-based nanoparticles comprise carbon nanotubes.

10. The method of claim 1, wherein the thermal material presents an increase in thermal conductivity of the polymeric fluid by an amount of 100% or greater.

11. The method of claim 1, wherein the thermal material presents a thermal conductivity of 0.1 W/m-K or greater.

12. The method of claim 1, wherein the boron-containing material is present in an amount of 7% or greater by weight, based on the total weight of the polymeric fluid.

13. The method of claim 1, wherein the boron-containing material is present in an amount of 20% or greater by weight, based on the total weight of the polymeric fluid.

14. The method of claim 8, wherein the carbon-based nanomaterial is present in an amount of 3% or greater by weight, based on the total weight of the polymeric fluid.

15. A method comprising:
forming a first solution by mixing a polymeric fluid in a solvent;
forming a second solution by mixing a boron nanomaterial precursor, a surfactant having a surface charge, and a magnetic nanomaterial, wherein the surface charge of the surfactant facilitates the surfactant to interact with the boron nanomaterial precursor to uniformly distribute the boron nanomaterial precursor in the second solution;
filtering the second solution to obtain a boron-containing material;
forming a third solution by adding the boron-containing material to the first solution;
aligning, in the third solution, the boron-containing material using an applied magnetic field; and
forming a thermal material by cooling the third solution;
wherein the polymeric fluid is selected to be operable to undergo hydrogen bonding with the boron-containing material.

16. The method of claim 15, wherein the magnetic nanomaterial comprises a metallic nanomaterial.

17. The method of claim 15, wherein the magnetic nanomaterial is selected from the group consisting of $Al_2O_3$, CuO, MgO, $SiO_2$, $GeO_2$, $B_2O_3$, $TeO_2$, $V_2O_5$, $BiO_2$, $Sb_2O_5$, $TiO_2$, ZnO, and $CrO_3$.

* * * * *